United States Patent Office 3,290,142
Patented Dec. 6, 1966

3,290,142
PROCESS OF PREPARING A REACTIVE
IRON ADDITIVE
Chauncey C. Loomis, Stockbridge, Mass., assignor to
Chas. Pfizer & Co., Inc., New York, N.Y., a corporation of Delaware
No Drawing. Filed Jan. 10, 1964, Ser. No. 336,866
8 Claims. (Cl. 75—58)

This invention is concerned with the introduction of magnesium into metal products, and more particularly with the preparation of a new, reducible, magnesia-containing metal additive of enhanced stability.

It is known that iron, and especially iron hypereutectic with respect to carbon, may be improved in physical properties by addition thereto of small concentrations of magnesium, e.g. to remove sulfur from steel, or to provide a cast iron having predominantly nodular graphite content. Owing to the low boiling point of magnesium (relative to the melting point of iron) it has been proposed in the past to form the magnesium in situ, by introduction of a magnesia source, particularly calcined dolomitic limestone, in combination with a silicon-containing reducing agent. While such compositions afford improved control in the addition of magnesium to molten iron, they suffer from pronounced physical and chemical instability, and readily absorb moisture and carbon dioxide from the atmosphere, with serious adverse effect on magnesium availability. In an attempt to improve stability and to facilitate handling and introduction to the molten iron, such compositions have been compressed into briquettes. The resulting aggregates are, however, extremely fragile, and they quickly crumble to powder when handled. Moreover, their chemical stability in storage is unsatisfactory.

A process has now been discovered for the preparation of a new and improved additive for iron which is free of the aforesaid disadvantages. This new process provides for the first time a practical magnesium source for the described purpose in the form of a coherent aggregate of excellent physical and chemical stability. An important feature of the new process is a heating or roasting step, more fully described hereinafter, which converts fragile aggregates of the nature described into very hard and strong solids of altered composition and greatly enhanced resistance to decomposition. Even after prolonged storage in contact with air, these new products resist absorption of moisture and carbon dioxide, and provide rapid release of magnesium in molten iron at high recovery levels.

Suitable compositions for the new process employ pulverized calcined dolomitic limestone, which consists essentially of magnesium oxide and calcium oxide. In addition, these compositions contain a reducing agent preferably ferrosilicon of 50–95 weight percent silicon content, and especially of about 75% silicon content. The proportion of silicon in the composition may range from about 0.5 to 1.5 equivalent per magnesium equivalent, and preferably from about 1 to 1.20. Silicon ratios above 1.5 may be employed, but they are generally uneconomic. Similarly, the use of silicon ratios below 0.5 is possible, but not preferred, because they may require the separation of excessive quantities of unreacted magnesia from iron melts to which they are introduced.

It is often preferable, but not essential, to include a catalyst or promoter in these compositions, to facilitate magnesium release. Inorganic fluorides such as cryolite are effective for this purpose, and those particularly preferred include fluorspar (calcium fluoride) and magnesium fluoride, suitably at a level of from about 0.5 to 5% of the total weight.

Other additives, such as aluminum, may be included if desired. However, the use of significant proportions of water, alone or in combination with magnesium chloride, to promote aggregation may have an adverse effect on magnesium availability and is therefore best avoided.

A dry blend of the described ingredients is prepared by conventional techniques. In the compression of these blends, steam improves coherence and may be injected, with care to avoid excessive moistening of the powder. The powder is pressed to a coherent mass, e.g. a briquette suitably about 1 x 1–½ x 4 inches in size, in a standard briquetting press such as a Komareck Greaves unit, employing kerosene as mold lubricant if desired.

This molding is now subjected to heating or roasting in the substantial absence of oxygen and at a temperature of at least about 1000° F. Spectrographic studies show that when this is done the lime, i.e. calcium oxide, and free silicon contents of the composition are reduced, while the magnesia content is still the same. It is believed that the MgOCaO·FeSi composition is converted to an MgO·CaSiFe composition during the roast, but whatever the explanation, a significant, concurrent hardening occurs.

The roasting temperature should be at least about 1000° F., to insure the beneficial effects. The maximum roasting temperature will be dictated primarily by equipment limitations rather than by chemical considerations. For roasting under an inert gas, such as helium, argon or hydrogen, temperatures of 2200° F. and higher may be employed if desired, provided the substantial exclusion of oxygen can be maintained. Alternatively, oxygen may be excluded by conducting the reaction under vacuum, e.g. at a pressure of 0.1–2 mm., in which case the temperature is preferably maintained below about 1900° F.

Heating is continued for a period sufficient to substantially reduce the lime and silicon content, but is halted before the magnesia content is altered substantially. The time required will vary, of course, with such factors as the temperature, the composition, and the rate of heat transfer. Accordingly, the time for the composition change and concurrent hardening is best determined experimentally under given conditions. The period required is generally brief, ranging from several minutes at the higher roasting temperatures to a few hours at the lower temperatures.

After heating, the molding should be protected from oxygen until cool, whereupon the original fragile, unstable briquette is found to have been greatly changed in chemical and physical properties. It has become very hard and strong, and is no longer susceptible to lime hydration even in boiling water. Even after prolonged storage, the new product is capable of releasing high levels of magnesium, as can be demonstrated by reheating under vacuum, which causes rapid evolution of metallic magnesium at a high rate of recovery.

The new product may be preserved in block form, or it may be converted to a granular state by suitable mechanical means, e.g. by a roll crusher.

For introduction of magnesium into iron for its known beneficial effects, the new composition is combined with molten iron and maintained at a magnesia-reducing temperature until the desired magnesium content is attained. If the composition of the iron corresponds to grey cast iron, i.e. an iron hypereutectic with respect to carbon, it is transformed to a ductile iron, having predominantly nodular graphite content, by treatment with from about one to ten pounds of the new product per ton, whereby 0.01% or more magnesium is introduced into the metal.

The temperatures at which magnesia will be reduced to magnesium will vary with the composition, and with the concentration of the fluoride catalyst or promoter, if any. Ordinarily temperatures between about 2200 and 3100° F. will be preferred, with the higher temperatures employed where no fluoride catalyst is present. It should be understood, of course, that the iron is maintained molten during the release of the magnesium.

A convenient technique for combining the new additive with iron includes covering the substance with pieces of scrap metal in the ladle and then introducing molten iron, thus minimizing the tendency of the additive to float to the surface before its magnesium has been released to the melt. When the desired magnesium content has been attained, e.g. 0.02%, the melt is cast and cooled, leaving behind any sludge of calcium silicate or the like.

The following examples are illustrative, and should not be interpreted as limiting the invention, the scope of which is defined by the appended claims.

*Example 1*

Pulverized, calcined dolomitic limestone is blended with ferrosilicon of 75% silicon content, in the proportion of 1.2 equivalent of silicon per magnesium equivalent. Also included is 2% by weight of fluorspar. The blend is compressed in a standard briquetting press to form fragile, friable molded aggregates.

These are roasted in a helium atmosphere for one hour at 2000° F. and then cooled under helium. The treated briquettes are very hard and strong, and no longer contain free lime susceptible to hydration even by boiling water.

*Example 2*

A blend of calcined dolomite with 90% ferrosilicon (1.0 silicon equivalent per magnesium equivalent) plus 0.5% magnesium fluoride is molded as before and then heated at 1880° F. at 1.5 mm. pressure for one hour to prepare a stable product like that of Example 1.

*Example 3*

A series of experiments is conducted employing pulverized, calcined dolomitic limestones containing about 30–45% magnesia with about 50–60% lime content and the balance silicates and related impurities. These are blended with ferrosilicon in the proportions listed, and molded as before.

| Ferrosilicon | | Catalyst | Weight Percent |
|---|---|---|---|
| Si, Percent | Equiv. Si/ Equiv. Mg | | |
| 80 | 1.0 | $CaF_2$ | 2 |
| 80 | 1.0 | $MgF_2$ | 2 |
| 95 | 0.5 | None | |
| 75 | 1.5 | $Na_3AlF_6$ | 2 |
| 70 | 1.2 | $MgF_2$ | 5 |
| 50 | 1.2 | $CaF_2$ | 0.5 |

These products are roasted at temperatures of from 1000 to 2500° F. while protected from oxygen, until their silicon and lime contents are substantially reduced without substantial alteration in magnesia content. They form hard, stable products similar to those of the previous examples.

After five weeks' storage in air, samples of the products of these examples are tested for magnesium availability. Upon reheating at 2150° F. in vacuum they readily release magnesium, 10–15% by weight and higher.

*Example 4*

The product of Example 1 is combined in the proportion of 5 pounds per ton with an iron having a composition equivalent to gray cast iron. The additive is covered with scrap metal and the molten iron is added. After 2–5 minutes at 2700° F. the melt is cast to a ductile cast iron having a magnesium content of about 0.02%.

The other roasted products of Examples 1–3, in whole or granular (crushed) form, are introduced into molten iron in similar manner, at levels of 1 to 10 pounds per ton, to remove sulfur from steel and to nodularize cast iron compositions.

What is claimed is:

1. A process for the preparation of a reactive iron additive of enhanced stability under storage conditions, said process comprising the steps of forming a dry blend comprising pulverized calcined dolomitic limestone consisting essentially of magnesium oxide and calcium oxide and sufficient ferrosilicon of about 50–95 weight percent silicon content to provide from about 0.5 to about 1.5 equivalent of silicon per magnesium equivalent, pressing said blend into a coherent mass, roasting said mass in the substantial absence of oxygen at a temperature of at least about 1000° F. for a period of time sufficient to substantially reduce the lime and silicon content of said mass without substantially altering the magnesia content thereof, and cooling said mass in the substantial absence of oxygen.

2. The process of claim 1 wherein the silicon content of said ferrosilicon is approximately 75% by weight.

3. The process of claim 1 wherein said ferrosilicon proportion is selected to provide from about 1 to 1.2 equivalent of silicon per magnesium equivalent.

4. The process of claim 1 wherein said roasting is conducted in an inert gas.

5. The process of claim 1 wherein said roasting is conducted under vacuum at a temperature below about 1900° F.

6. The process of claim 1 wherein said blend includes from about 0.5 to about 5% by weight of an inorganic fluoride.

7. The process of claim 6 wherein said fluoride is fluorspar.

8. The process of claim 6 wherein said fluoride is magnesium fluoride.

References Cited by the Examiner

UNITED STATES PATENTS

| | | | |
|---|---|---|---|
| 2,237,011 | 4/1941 | Pokorny | 75—129 X |
| 2,540,173 | 2/1951 | Olivo | 75—130 X |
| 2,552,204 | 5/1951 | Morrogh | 75—130 |
| 2,726,152 | 12/1955 | Eash | 75—130 |
| 2,837,422 | 6/1958 | Motz et al. | 75—130 X |
| 2,988,445 | 6/1961 | Hurum | 75—130 X |

DAVID L. RECK, *Primary Examiner.*

H. W. TARRING, *Assistant Examiner.*